United States Patent [19]
Hori et al.

[11] Patent Number: 4,518,807
[45] Date of Patent: May 21, 1985

[54] PROCESS FOR THE PRODUCTION OF BASIC ALKALINE EARTH METAL PHENATES

[75] Inventors: Takashi Hori; Sanae Ueda, both of Saitama; Yoshihiro Kojima, Ibaraki, all of Japan

[73] Assignee: Maruzen Oil Co., Ltd., Osaka, Japan

[21] Appl. No.: 521,811

[22] Filed: Aug. 10, 1983

[30] Foreign Application Priority Data

Aug. 16, 1982 [JP] Japan ................................. 57-142393

[51] Int. Cl.$^3$ ...................... C07C 39/00; C07C 39/04
[52] U.S. Cl. .................................................... 568/716
[58] Field of Search ................................ 568/716, 780

[56] References Cited

U.S. PATENT DOCUMENTS 2,870,134  1/1959  Kluge et al. ........................ 568/716
3,333,020  7/1967  Howald et al. .................... 568/716
3,372,116  3/1968  Meinhardt ......................... 568/716

Primary Examiner—Werren B. Lone
Attorney, Agent, or Firm—Sughrue, Mion, Zinn, Macpeak & Seas

[57] ABSTRACT

A process for the production of a basic alkaline earth metal phenate is disclosed. The process comprises reacting a phenol, a dihydric alcohol, and an alkaline earth metal agent selected from alkaline earth metal oxides and hydroxides to achieve the addition of the alkaline earth metal to the phenol, wherein water is added to the reaction system in an amount of from 0.01 to 10 mols per mol of the alkaline earth metal agent. This basic alkaline earth metal phenate is useful as an additive for lubricating oils and fuel oils.

22 Claims, No Drawings

PROCESS FOR THE PRODUCTION OF BASIC ALKALINE EARTH METAL PHENATES

FIELD OF THE INVENTION

The present invention relates to a process for commercially advantageously producing basic or over-based alkaline earth metal phenates or sulfurized alkaline earth metal phenates which are useful as detergents or alkaline detergents for lubricating oils or fuel oils.

BACKGROUND OF THE INVENTION

Basic phenates are generally used in lubricating oils for internal combustion engines, and exhibit a marked effect in preventing corrosive wear, formation of piston ring groove deposits, piston ring sticking, etc., by neutralizing or dispersing acids such as oxyacids or sulfuric acid, sludge, lacquers, carbon, etc.

From the standpoint of the function of acid neutralization, phenates can be classified into two types, one type being called normal phenates containing a theoretical amount, one gram equivalent, of metal per equivalent of phenolic hydroxyl group; and the other type being called basic phenates or over-based phenates, e.g., as disclosed in U.S. Pat. No. 3,464,970 and British Pat. No. 1,280,749, containing metal in an amount larger than the theoretical amount, wherein a theoretical amount is considered the reaction of 1 gram equivalent of alkaline earth metal reacted per equivalent of phenolic hydroxyl group. The present invention relates to a novel process for preparing basic or over-based phenates containing metal in an amount larger than the theoretical amount.

Heretofore, two typical methods for introducing sulfur into phenates have been known. One method comprises converting an alkyl phenol to the sulfide thereof using sulfur chloride, for example, and, thereafter, converting the sulfide to a metal salt. The other method comprises sulfurizing the phenol at the time of adding a metal or sulfurizing the metal salt (phenate) using elemental sulfur. The present invention is based on the latter method of sulfurization.

A number of techniques have been developed to produce over-based phenates by the latter method of sulfurization. It is now possible to produce over-based phenates containing an alkaline earth metal in an amount of at least two times the theoretical amount based on the hydroxy group of phenols by the one-step reaction. U.S. Pat. Nos. 3,464,970 and 3,725,381, and Japanese Pat. Nos. 533079 and 613543, for example, disclose that over-based phenates which contain the metal added in an amount of at least two times the theoretical amount based on the phenol and which are stable and oil-soluble can be prepared by performing a sulfurization reaction and a metal addition reaction at the same time in the presence of a higher alcohol solvent and then treating the reaction product with carbon dioxide. In addition, U.S. Pat. No. 4,123,371 discloses that if the above-described reactions are conducted in the presence of excess amounts of phenols, there can be prepared alkaline earth metal phenates of unexpectedly high basicity.

In these methods, however, if it is desired to increase the conversion or incorporation of an alkaline earth metal agent into the product per reaction cycle (which is hereinafter referred to as a "product conversion"), it is required for the dihydric alcohol being used for the metal addition reaction to be added in a larger excess amount than that actually consumed for the preparation of the desired product. When the reaction product is treated with carbon dioxide after the metal addition reaction, if a large amount of dihydric alcohol exists in the reaction system, or if a large amount of dihydric alcohol remains in the ultimate product, the stability of the product is reduced. It is, therefore, necessary to distill away an excess of dihydric alcohol after the completion of the metal addition reaction. In general, however, the removal of the high boiling dihydric alcohol by distillation requires a long period of time. Thus, the utilities required for this purpose are increased, and moreover it leads to a serious reduction in the yield of the phenate per unit time. In addition, the use of an excess of dihydric alcohol for the metal addition reaction results in a decrease in the yield of the phenate per unit volume of the reactor.

Decreasing the amount of the dihydric alcohol to be used in the conventional methods for the purpose of avoiding the above-described problems yields another problem that the product conversion of the alkaline earth metal agent drops. This drop in the product conversion of the alkaline earth metal agent leads to the formation of insoluble materials in the course of the reaction. The alkaline earth metal agent converted into such insoluble materials cannot be recycled and reused unlike the phenols and dihydric alcohol. This leads to a decrease in the yield of the basic phenate. Moreover, if large amounts of insoluble materials are present, the operation of removing them becomes troublesome.

As a result of extensive investigations to overcome the above-described problems, it has been found that if water is added to the reaction system at the time of performing the metal addition reaction of an alkaline earth metal agent with phenols, the metal addition reaction proceeds smoothly even if the amount of the dihydric alcohol being used is decreased. Further, the product conversion of the alkaline earth metal agent can be maintained at a high level, and the time and utilities required for the distillation of the reaction product after the completion of the metal addition reaction can be greatly reduced. Accordingly, basic or over-based alkaline earth metal phenates or sulfurized alkaline earth metal phenates (hereinafter collectively referred to as "basic alkaline earth metal phenates") can be produced advantageously from an industrial standpoint.

It is known that in the sulfurization and metal addition reaction of phenols using phenols, dihydric alcohols, elemental sulfur, and an alkaline earth metal agent, as the reaction proceeds, water is formed in a nearly equimolar amount to that of the alkaline earth metal agent reacted. Heretofore, the water thus-formed has ordinarily been removed simultaneously with the formation thereof. Water is almost incapable of dissolving an alkaline earth metal agent such as a calcium agent and does not serve as a solvent. Conversely, water has been considered to be an obstacle lowering the dissolution ability of other solvents. Although the mechanism for the sulfurization and metal addition reaction and the chemical structure of the product are not fully understood at the current time, it could not have been expected at all from the water being formed during the reaction that the addition of a suitable amount of water prior to the start of the reaction or in the course of the reaction produces a marked effect of accelerating the progress or completion of the reaction. Thus, the present invention is based on the unexpected and new discovery as described above.

SUMMARY OF THE INVENTION

A primary object of the invention is to provide a novel process for efficiently producing basic alkaline earth metal phenates having a high ability to neutralize acids.

A secondary object of the invention is to provide a process for the production of basic alkaline earth metal phenates which makes it possible to increase the product conversion of an alkaline earth metal agent and also to simplify the removal by distillation of a dihydric alcohol from the reaction product and the removal of insoluble materials.

Other objects of the invention will become apparent from the following detailed explanation.

According to the present invention, there is provided a process for producing a basic alkaline earth metal phenate which comprises providing reactants comprised of a mixture of a phenol, a dihydric alcohol, and an alkaline earth metal agent selected from the group consisting of alkaline earth metal oxides and hydroxides, allowing the reactants to react and achieve addition of the metal to the phenol, and adding water to the reactants while they are allowed to react, the water being added in an amount of from 0.01 to 10 mols per mol of the alkaline earth metal agent.

DETAILED DESCRIPTION OF THE INVENTION

In a preferred embodiment of the invention, the reactants consisting materially of a phenol, a dihydric alcohol, and an alkaline earth metal agent is reacted to achieve the addition of the metal to the phenol, in which water is added to the reaction system.

Another preferred embodiment of the invention is to react the reactants consisting materially of a phenol, a dihydric alcohol, sulfur, and an alkaline earth metal agent to achieve the addition of the metal to the phenol and the sulfurization thereof at the same time, in which water is added to the reaction system.

Another preferred embodiment of the invention is directed to the production of basic alkaline earth metal phenates in which the addition of the metal to phenols is performed, or the addition of the metal to phenols and the sulfurization thereof are performed at the same time wherein water is added to the reaction system, and thereafter the reaction product is further treated with carbon dioxide.

Another and particularly preferred embodiment of the invention is directed to the production of basic alkaline earth metal phenates in which the addition of the metal to phenols is performed, or the addition of the metal to phenols and the sulfurization thereof are performed at the same time in the presence of an excess of phenols or diluents wherein water is added to the reaction system, the reaction product is distilled to remove at least a part, of the added water and the formed water, or at least a part, of the added water, the formed water, and unreacted dihydric alcohol, the resulting distillation residue is treated with carbon dioxide, and the thus-obtained mixture is distilled to remove unreacted phenols and unreacted dihydric alcohol, or unreacted phenols, unreacted dihydric alcohols, and at least a part of the diluent, whereby the distillation residue is obtained as the desired product.

Starting materials as used herein will hereinafter be explained.

Phenols which can be used in the invention include, for example, phenols which contain a hydrocarbon side chain containing from 4 to 36 carbon atoms, preferably from 8 to 32 carbon atoms, such as an alkyl group, an alkenyl group, and an aralkyl group. Specifically, phenols containing a hydrocarbon group, such as butyl, amyl, octyl, nonyl, dodecyl, cetyl, ethylhexyl, and triacontyl, or a hydrocarbon group (e.g., having 8 to 32 carbon atoms) derived from a petroleum hydrocarbon, such as white oil, paraffin and wax, or polyolefins having a molecular weight of about 56 to 504 (e.g., polyethylene, polypropylene, and polybutene) can be used alone or in combination with each other. Preferred phenols are those which are liquid usually at about 130° C., more preferably at about 120° C. Particularly preferred phenols are alkylphenols having an alkyl group containing 8 to 32 carbon atoms.

The alkaline earth metal agent can be an alkaline earth metal oxide or an alkaline earth metal hydroxide. Suitable examples are the oxides or hydroxides of calcium, barium, strontium, and magnesium. The oxides or hydroxides of calcium and barium are particularly preferred. The ratio of the alkaline earth metal agent being used to the phenol being used can be varied over a wide range. For example, the amount of the alkaline earth metal agent being used is preferably from about 0.001 to 20 equivalents, more preferably from about 0.01 to 6 equivalents, per equivalent of the phenol being used. Even if either phenol or the alkaline earth metal agent is used in an excess amount, no further advantage can be obtained, and it is correspondingly wasteful.

Suitable dihydric alcohols which can be used are preferably those compounds which have a relatively low boiling point and a low viscosity, and are of high reactivity. Preferably, these dihydric alcohols contain from 2 to 6 carbon atoms. Particularly preferred are ethylene glycol and propylene glycol. The amount of the dihydric alcohol used is from about 0.15 to 3.0 mols, particularly preferably from about 0.3 to 1.5 mols, per mol of the alkaline earth metal agent being used. The dihydric alcohol acts to accelerate the conversion of the phenol and the alkaline earth metal agent into an oil-soluble substance through the reaction therebetween and to stabilize the oil-soluble substance, and moreover, a part of the dihydric alcohol is incorporated into the phenate product, constituting a basic phenate. If the amount of the dihydric alcohol used is too small, the product conversion of the starting materials, particularly the alkaline earth metal agent drops. In the present invention, however, the amount of the dihydric alcohol used can be reduced as compared with conventional methods, by the addition of water as described hereinafter. On the other hand, if the amount of the dihydric alcohol used is too large, although the reaction of addition of the metal to the phenol proceeds smoothly, the time and utilities required for distilling off the excessive dihydric alcohol from the reaction product are undesirably increased.

The amount of sulfur (elemental sulfur) can be varied over a wide range. The usual amount of sulfur being used is about 4.0 mols or less, preferably from about 0.001 to 3.0 mols, per mol of the alkaline earth metal agent being used. If the amount of sulfur used is too large, basic phenates are difficult to obtain. The reaction may be performed without the use of sulfur. All allotropic forms of sulfur can be used.

As water to be added to the reaction system in the metal addition reaction of the alkaline earth metal agent to the phenol, condensed water discharged from a boiler, industrial water, water formed in the metal addition reaction, etc., as well as distilled water can be used. Particularly, water not substantially containing an impurity is preferred. Accordingly, the water having a high chlorine content or a high content of acids such as sulfuric acid, nitric acid, silicic acid, etc., is not preferred. The water having pH of 6.3 to 7.2, a chlorine content of 10 wt ppm or less and an acid content of 40 wt ppm or less can be used. Moreover, water can be used in any suitable state, such as cold water, hot water, or steam. Water may be introduced into the reactor singly or as a mixture of all or part of the water and other starting materials, such as alkylphenols, dihydric alcohols, and higher alcohols.

Water can be introduced into the reactor at any suitable point, e.g., before or after all the starting materials except water are mixed. It is preferred, however, that water be added within one hour after mixing all the starting materials. The amount of water being added to the reaction system is from about 0.01 to 10 mols, preferably from about 0.1 to 2.0 mols, per mol of the alkaline earth metal agent being used. If the metal addition reaction is carried out adding water to the reaction system from the outside thereof, the reaction proceeds smoothly and the product conversion of the starting material, particularly the alkaline earth metal is increased, compared with the case in which the reaction is performed under the same conditions as above except that water is not added. Moreover, as compared with the case in which the reaction is performed under the same conditions as above except that water is not added and a larger amount of dihydric alcohol is used, the product conversion of the starting material can be kept at the same level or increased to a higher level. Thus, the step of distillation after the reaction can be greatly simplified. If the amount of water added to the reaction system is too small, the product conversion of the alkaline earth metal agent undesirably drops. On the other hand, the addition of a too large amount of water will lead to the loss of the foregoing advantage, which is a simplified distillation after the reaction.

In the present invention, diluents or solvents (hereinafter collectively referred to as "diluents") having a suitable viscosity can be employed to facilitate the handling of the reactants, the reaction intermediates, or the products. For example, when the excess unreacted phenol is to be recovered by distillation from the reaction product after the metal addition reaction or the treatment using carbon dioxide, the distillation in the presence of a suitable diluent can afford a distillation residue or bottoms in a liquid form that is desirable. Usually, a portion of the diluent distills off with the distillation of the unreacted phenol. Therefore, preferred diluents do not directly exert adverse influences on the reaction, when the recovered phenol is repeatedly reused in the reaction. The reaction may be performed in the presence of a diluent. Examples of suitable diluents are petroleum fractions, e.g., lubricating oil fractions having a boiling point of from about 220° to 550° C. and a viscosity of from about 2 to 40 cSt at 100° C., such as paraffinic, naphthenic, aromatic or mixed base stocks. Other organic solvents can be used as diluents as along as they are hydrophobic and oleophilic, and are not detrimental during the reaction or in the products in end use. For example, higher alcohols containing from 8 to 24 carbon atoms can also be used.

The main production steps and operating conditions employed in the process of the invention to produce basic phenates are described in detail below.

During the metal addition reaction step, water is added to a starting material mixture of a phenol, a dihydric alcohol, and an alkaline earth metal agent, in an amount of from 0.01 to 10 mols, preferably from 0.1 to 2.0 mols, per mol of the alkaline earth metal agent before the start of the reaction or in the course of the reaction and, if necessary, sulfur is further added. The reaction is performed in a temperature range of from about 60° to 200° C., preferably from about 90° to 190° C. When sulfur is used in combination, the sulfurization reaction occurs simultaneously with the metal addition reaction. When sulfur is used, hydrogen sulfide formed during the reaction is preferably removed from the reaction system. The present reaction is usually completed within the range of from about 1 to 9 hours. It is preferred that at least about 30%, more preferably at least about 60% of the water added and formed during the reaction be distilled off after the reaction. If a large amount of water remains in the final product, the stability of the product is reduced. Moreover, if a large amount of water remains in the system when the product is treated with carbon dioxide, in some cases, the product conversion of the alkaline earth metal agent undesirably drops and the desired basic alkaline earth metal phenate cannot be obtained. In the process of the invention, since only a small amount of dihydric alcohol remains in the reaction product, it is not at all necessary to distill off the dihydric alcohol, or even when the dihydric alcohol is distilled off, it can be completed in a short period of time.

Although the basic alkaline earth metal phenate produced at the metal addition reaction can be used as a final product, if it is desired to further increase the stability and oil-solubility of the product, it is desirable for the product to be subjected to a carbon dioxide treatment. In this carbon dioxide treatment step, the liquid distillation residue leaving the metal addition reaction step is, for example, introduced into an autoclave and reacted with carbon dioxide at a temperature of from about 50° to 230° C., preferably from 80° to 200° C. If necessary, the product is further kept in a carbon dioxide atmosphere at a temperature of from about 100° to 230° C. for a period of from several minutes to 20 hours, preferably from 0.5 to 10 hours. In the carbon dioxide treatment step, carbon dioxide undergoes a reaction and is introduced into the side chain of the phenol and the phenolic aromatic ring. A salicylate as well as the phenate was detected by analysis of the reaction product. Since the salicylate is a kind of phenate, the term "phenate" is used herein to include both the compound in which carbon dioxide is introduced into the side chain of the phenol and the compound in which carbon dioxide is introduced into the phenolic aromatic ring. If desired, the reaction product after the treatment with carbon dioxide can be subjected at least once to a metal addition reaction as described above by adding a fresh alkaline earth metal agent and dihydric alcohol and then to the carbon dioxide treatment, whereby to achieve additional metal addition. It is preferred from an economic standpoint, for example, that a part or most of the unreacted phenol in the reaction product solution obtained after the carbon dioxide treatment is recovered. The phenol thus-recovered can be reused as a starting material. The excess dihydric alcohol remaining in the metal addition reaction step is recovered with the unreacted phenol, etc., before or after the carbon dioxide treatment. If the distillation of the unreacted phenol is performed in the presence of a usual diluent, such as a mineral oil having a high boiling point, the distillation residue can be obtained in a liquid state that is desirable. The insoluble materials in the distillation residue can be removed by techniques such as filtration and centrifugal separation before or after the recovery of the phenol.

The present invention can be used to prepare a basic phenate having a large amount of an alkaline earth metal added per unit amount of phenol in a good yield based on the metal used, despite the fact that a relatively simple process and small number of starting materials are used. In accordance with the process of the invention in which the metal addition reaction is performed by adding water to the reaction system, the reaction proceeds smoothly and the product conversion of the starting material, particularly the alkaline earth metal agent can be maintained at a high level, even if the dihydric alcohol is used in lesser amounts than in conventional methods. Thus the desired basic alkaline earth metal phenate can be obtained in a high yield.

A reduction in the amount of the dihydric alcohol being used at the metal addition reaction step produces various advantages: for example, the yield of the desired product per unit volume of the reactor is increased, leading to an increase in productivity; and since the time required for the total process is shortened by the great simplification of the distillation step after the metal addition reaction, the productivity is greatly increased and the utilities required for the distillation can be greatly reduced. Moreover, if the amount of the dihydric alcohol being used for the metal addition reaction is reduced, it is not at all necessary to remove the dihydric alcohol from the reaction product, or even if necessary, it is sufficient to remove only a small portion. Therefore, the tolerable amount of the dihydric alcohol in the system need not be controlled at the distillation step subsequent to the reaction, but can be controlled by the amount of the dihydric alcohol to be charged at the metal addition step. This yields the effect that the operation of distillation is simplified. Thus, the process of the invention permits the industrially advantageous production of stable and oil-soluble basic alkaline earth metal phenates.

The present invention is specially illustrated in greater detail by reference to the following Examples and Comparative Examples.

EXAMPLE 1

A four-necked flask equipped with a stirrer, a condenser tube, a nitrogen gas inlet tube, and a thermometer was charged with 206 g (1.0 mol) of paraoctyl phenol, 48.1 g (1.5 mol) of sulfur, 57.1 g (1.0 mol) of calcium oxide having a purity of 98.3% by weight, and 999 g of lauryl alcohol, and the starting materials were stirred. A mixture of 62 g (1.0 mol) of ethylene glycol and 10.8 g (0.6 mol) of water was added to the above-prepared suspension in a stream of nitrogen at 135° C. under atmospheric pressure over a period of 30 minutes. The resulting mixture was stirred at 135° C. for 4.5 hours to effect the metal addition reaction. Then, while the pressure in the reaction system was gradually reduced, the water added, the water generated in the reaction, and a very small amount of ethylene glycol were distilled off to obtain 1,348 g of a dark yellowish green liquid distillation residue. The temperature of the final distillate was 104° C. (19 mm Hg). In this distillation process, water was mainly distilled off, and it could be performed in a short period of time in a simplified manner.

The thus-obtained distillation residue was placed in an autoclave and caused to absorb carbon dioxide under an elevated pressure (not more than 12 kg/cm$^2$) at a temperature of 123°–126° C. for 30 minutes. The reaction system was then maintained at 155° C. for 2 hours under an elevated pressure (not more than 9 kg/cm$^2$) to obtain 1,384 g of a dark yellowish green reaction product solution.

The reaction product solution after the carbon dioxide treatment as described above and 558.2 g of a 150 neutral oil (a paraffinic lubricating oil having a viscosity of 5.38 cSt at 100° C.) were placed in a 2-liter pear-shaped two-necked flask, from which the para-octyl phenol, the diluent, lauryl alcohol, and a small amount of ethylene glycol were distilled off under reduced pressure to obtain 835.0 g of a distillation residue. The temperature of the final distillate was 143° C. (1.0 mm Hg). This distillation residue was filtered to remove 2.9 g of an insoluble portion, and there was thus obtained 832.0 g of the final product, a dark yellow transparent liquid. The amount of the insoluble portion was very small, and thus the filtration process could be performed in a simple manner.

For the thus-obtained final product containing the desired basic alkaline earth metal as an active component, the product conversion of each starting material (the conversion of each starting material into the phenate product), the characteristics, and the metal addition equivalent ratio (the ratio in equivalent of the alkaline earth metal agent to the phenol, wherein both indicate the amounts reacted to form the basic alkaline earth metal phenate) were measured, and the results are shown in Table 1. The product conversion of each starting material and the metal addition equivalent ratio were calculated from the material balance of the starting materials. The viscosity of the final product, the basic number (according to JIS K 2500), the calcium content, and the sulfur content were actually measured.

In Example 1, at the metal addition reaction step, a higher alcohol diluent was used and water was added to the reaction system from the outside thereof. As can be seen from Table 1, the product conversion of each starting material, particularly calcium oxide is very high (therefore, the residual amount of the insoluble portion is small) and there can be obtained a basic alkaline earth metal phenate of high metal addition equivalent ratio.

COMPARATIVE EXAMPLE 1

A basic alkaline earth metal phenate was prepared in the same manner as in Example 1 except that water was not added and the amount of the mineral oil being added after the carbon dioxide treatment was changed to 500 g. The amount of the insoluble portion was as high as 11.3 g. The yield of the final product was 635.7 g. The product conversion of each starting material and the characteristics of the final product are shown in Table 1 below.

It can be seen from Table 1 that in Comparative Example 1, since water is not added to the reaction system at the metal addition reaction step, the product conversion of calcium oxide is seriously low compared with that of Example 1; calcium oxide is used wastefully, and moreover, the residual amount of the insoluble portion is very large compared with Example 1.

TABLE 1

|  | Example 1 | Comparative Example 1 |
|---|---|---|
| Product Conversion of Starting Material (%) | | |
| CaO | 97.4 | 85.8 |
| POP* | 69.8 | 84.5 |
| S | 60.5 | 57.6 |
| EG** | 59.1 | 39.8 |
| $CO_2$ | 71.5 | 41.5 |
| Characteristics of Final Product | | |
| Viscosity (cSt at 100° C.) | 19.73 | 53.71 |
| Basic Number (KOH mg/g) | 132 | 152 |
| Ca Content (wt %) | 4.70 | 5.45 |
| S Content (wt %) | 3.52 | 4.35 |
| Metal Addition Equivalent Ratio | 2.79 | 2.03 |

*POP: Para-octyl phenol
**EG: Ethylene glycol

EXAMPLE 2

The same four-necked flask as used in Example 1 was charged with 4.0 mols of nonyl phenol, 1.0 mol of calcium oxide, and 0.6 mol of sulfur, and the starting materials were stirred to prepare a suspension. A mixture of 0.8 mol of ethylene glycol and 0.9 mol of water was added to the above-prepared suspension while stirring in a stream of nitrogen under ordinary pressure at 125° C. over a period of 30 minutes, and the resulting mixture was stirred while heating at 130° C. for 5 hours to effect the metal addition reaction. Then, while the pressure in the reaction system was gradually reduced, water and a very small amount of ethylene glycol were distilled off to obtain a liquid distillation residue. The temperature of the final distillate was 25° C. (32 mm Hg). In this distillation process, water was mainly distilled off, and it could be performed in a short period of time in a simplified manner.

The thus-obtained liquid distillation residue was a basic alkaline earth metal phenate-containing solution having a viscosity of 200 cSt (at 100° C.), a calcium content of 4.08% by weight, a sulfur content of 1.46% by weight, and a metal addition equivalent ratio of 2.50. In order to increase the stability of the product, it is preferred for the product to be subjected to the following carbon dioxide treatment.

The distillation residue as obtained above was placed in an autoclave and caused to absorb carbon dioxide at an elevated pressure (not more than 12 kg/cm²) and a temperature of 120° C. for 30 minutes. It was then maintained under an elevated pressure (6 kg/cm²) at 175° C. for 2 hours to obtain a reaction product solution. This reaction product solution was diluted with 242.3 g of a diluent, 150 neutral oil, and the resulting mixture was filtered to remove 2.1 g of the insoluble portion. The thus-obtained filtrate was placed in a 2-liter pear-shaped two-necked flask and, by distilling off under reduced pressure a major portion of unreacted ethylene glycol and nonyl phenol remaining in the filtrate, 520.1 g of a distillation residue was obtained as a final product. The temperature of the final distillate was 155° C. (1 mm Hg). The final product, a basic alkaline earth metal phenate-containing solution, was measured for the product conversion of each starting material and characteristics (the content of reacted $CO_2$ was calculated from the material balance of the starting materials), and the results are shown in Table 2.

A part of the final product having the characteristics shown in Table 2 was subjected to column chromatography using silica gel as an absorbent and n-hexane as an eluent to isolate an active component. The active component, a pale yellow powder, as isolated above was hydrolyzed using an excess of 1N aqueous $H_2SO_4$ solution to obtain an oil layer. Liquid chromatographic analysis of the oil layer showed that a 15.3 mol% portion of the nonyl phenol constituting the active component was nonylsalicylic acid.

In this example, a solvent, lauryl alcohol, was not used in the metal addition reaction step and a large amount of phenol was used. As can be seen from Table 2, the product conversion of each starting material, especially calcium oxide, was very high, and there was obtained a basic alkaline earth metal phenate having a high metal addition equivalent ratio.

COMPARATIVE EXAMPLE 2

A basic alkaline earth metal phenate was prepared in the same manner as in Example 2 except that water was not added to the starting material mixture. The residual amount of the insoluble material was large; the residual amount of the insoluble material at the filtration step was as large as 24.6 g. Thus, a long period of time was taken for the operation of removing the insoluble material by filtration. The yield of the final product was 458.1 g. The product conversion of each starting material and the characteristics of the final product are shown in Table 2.

As can be seen from Table 2, the product conversion of calcium oxide is very low compared with that in Example 2 because in Comparative Example 2 water is not added to the reaction system from the outside therefrom at the metal addition reaction step unlike Example 2.

COMPARATIVE EXAMPLE 3

A basic alkaline earth metal phenate was prepared in the same manner as in Example 2 except that water was not added to the starting material mixture and the amount of ethylene glycol used was increased to 1.7 mols. Since a large amount of ethylene glycol was used, it was necessary to distill off the excess unreacted ethylene glycol from the reaction product solution before the treatment with carbon dioxide after the completion of the metal addition reaction. The time taken for this distillation was three times that in Example 2. The temperature of the final distillate was 79° C. (3.0 mm Hg). The amount of the insoluble material was 1.9 g and the yield of the final product was 529.2 g. The characteristics of the final product and the product conversion of each starting material are shown in Table 2.

As can be seen from Table 2, since in Comparative Example 3 water is not added to the reaction system from the outside therefrom at the metal addition reaction step unlike Example 2, but a large amount of ethylene glycol is used, the product conversion of calcium oxide is high and the residual amount of the insoluble material is reduced. However, since a large amount of ethylene glycol is used, a long period of time is taken for the removal by distillation of the excess unreacted ethylene glycol from the metal addition reaction product solution. Thus, the time and utilities taken from the preparation of the starting material mixture to the completion of the carbon dioxide treatment are 1.35 times those in Example 2.

TABLE 2

|  | Example 2 | Comparative Example 2 | Comparative Example 3 |
|---|---|---|---|
| Product Conversion of Starting Material (%) | | | |
| CaO | 98.9 | 69.1 | 99.0 |
| NP* | 19.8 | 16.1 | 22.4 |
| S | 69.9 | 65.2 | 78.8 |
| EG | 52.4 | 42.7 | 21.3 |
| $CO_2$ | 60.7 | 53.1 | 61.0 |
| Characteristics of Final Product | | | |
| Viscosity (cSt at 100° C.) | 101.8 | 42.0 | 129.3 |
| Basic Number (KOH mg/g) | 212 | 164 | 209 |
| Ca Content (wt %) | 7.56 | 5.86 | 7.44 |
| S Content (wt %) | 2.59 | 2.74 | 2.87 |
| Content of Reacted $CO_2$ (wt %) | 4.27 | 2.93 | 3.67 |
| Metal Addition Equivalent Ratio | 2.50 | 2.15 | 2.22 |

*NP: Nonyl phenol

EXAMPLE 3

The same four-necked flask as used in Example 1 was charged with 4.0 mols of nonyl phenol, 1.0 mol of calcium oxide having a purity of 100%, and 0.6 mol of sulfur, and a mixture of 0.6 mol of ethylene glycol and 2.5 mols of water was added to the suspension as prepared above under ordinary pressure at 125° C. over 30 minutes. The resulting mixture was then stirred while heating at 130° C. for 5 hours to effect the metal addition reaction. Then, while the pressure in the reaction system was gradually reduced, water and a very small amount of ethylene glycol were distilled off to obtain 967.4 g of a liquid distillation residue. The temperature of the final distillate was 23° C. (19 mm Hg), and the distillation process was completed in a short period of time.

The distillation residue (936.1 g) was placed in an autoclave and caused to absorb carbon dioxide at an elevated pressure (not more than 3.5 kg/cm$^2$) at 120° C. for 30 minutes. Subsequently, it was maintained under an elevated pressure (6.0 kg/cm$^2$) at 178° C. for 2 hours to obtain 967.5 g of a reaction product solution. Then, 956.1 g of the reaction product solution was diluted with 231.7 g of a 150 neutral oil, and the unreacted nonyl phenol and ethylene glycol were distilled off under reduced pressure from the resulting mixture to obtain a distillation residue. The temperature of the final distillate was 134° C. (3 mm Hg). The distillation residue was filtered to remove 2.4 g of the insoluble material and, as a final product, 546.6 g of a filtrate was obtained. The characteristics of the final product, a basic alkaline earth metal phenate-containing solution, and the product conversion of each starting material are shown in Table 3.

EXAMPLE 4

The same four-necked flask as used in Example 1 was charged with 651.8 g of recovered nonyl phenol as described hereinafter (a mixture of 2.50 mols of nonyl phenol, 0.07 mol of ethylene glycol, and 96.4 g of a mineral oil), 1.0 mol of calcium oxide having a purity of 98.1% by weight, 0.8 mol of sulfur, and 145.9 g of a 150 neutral oil, and a mixture of 0.73 mol of ethylene glycol and 0.20 mol of water was added to the suspension as prepared above under atmospheric pressure at 125° C. over 30 minutes. The resulting mixture was then stirred while heating at 130° C. for 4 hours to effect the metal addition reaction. By distilling off water and a very small amount of ethylene glycol under reduced pressure from the reaction product solution, 894.5 g of a liquid distillation residue was obtained. The temperature of the final distillate was 72° C. (10 mm Hg). This distillation process was completed in a short period of time.

The distillation residue (881.9 g) was placed in an autoclave and caused to absorb carbon dioxide under an elevated pressure (not more than 2.4 kg/cm$^2$) at 120° C. for 30 minutes. Subsequently, it was maintained under an elevated pressure (6.0 kg/cm$^2$) at 178° C. for 2 hours to obtain 917.4 g of a reaction product solution. Then, 867.4 g of the reaction product solution was distilled under reduced pressure to remove the unreacted nonyl phenol and ethylene glycol, whereby a distillation residue was obtained. The temperature of the final distillate was 158° C. (1.0 mm Hg). The distillate containing nonyl phenol and ethylene glycol as recovered by the distillation process was recycled to the above-described metal addition reaction step as a recovered nonyl phenol. The thus-obtained distillation residue was filtered to remove 2.5 g of the insoluble material, and there was thus obtained 398.6 g of a final product. The characteristics of the final product, a basic alkaline earth metal phenate-containing solution, and the product conversion of each starting material are shown in Table 3.

TABLE 3

|  | Example 3 | Example 4 |
|---|---|---|
| Product Conversion of Starting Material (%) | | |
| CaO | 98.5 | 77.7 |
| NP | 24.1 | 0.9 |
| S | 57.9 | 19.6 |
| EG | 52.7 | -4.2 |
| $CO_2$ | 53.6 | 72.8 |
| Characteristics of Final Product | | |
| Viscosity (cSt at 100° C.) | 108.1 | 149.7 |
| Basic Number (KOH mg/g) | 191 | 258 |
| Ca Content (wt %) | 6.79 | 1.21 |
| S Content (wt %) | 1.95 | 2.61 |
| Content of Reacted $CO_2$ (wt %) | 3.04 | 1.12 |
| Metal Addition Equivalent Ratio | 2.05 | 2.53 |

Examples 3 and 4 are experimental examples in which the amounts of water being added per the alkaline earth metal agent are large and small, respectively. In each case, the distillation process just after the metal addition reaction is simplified and moreover the product conversion of the alkaline earth metal agent is very high.

EXAMPLE 5

The same four-necked flask as used in Example 1 was charged with 3.0 mols of nonyl phenol, 0.914 mol of calcium hydroxide having a purity of 91.4% by weight, 0.6 mol of sulfur, and 242.3 g of a diluent, a 150 neutral oil, and a mixture of 0.8 mol of ethylene glycol and 0.9 mol of water was added to the suspension as prepared above under atmospheric pressure at 125° C. over 30 minutes. The resulting mixture was then stirred while heating at 115° C. for 4 hours to effect the metal addition reaction. From this reaction product solution was distilled off under reduced pressure water and a very small amount of ethylene glycol, and a liquid distillation residue was obtained. The temperature of the final distillate was 87° C. (12 mm Hg), and the distillation process was completed in a short period of time.

The distillation residue was placed in an autoclave and caused to absorb carbon dioxide under an elevated pressure (not more than 12 kg/cm²) at 120° C. for 30 minutes. Subsequently, it was maintained under an elevated pressure (6 kg/cm²) at 155° C. for 2 hours to obtain a reaction product solution. This reaction product solution was distilled under reduced pressure to remove the unreacted nonyl phenol and ethylene glycol, and there was thus obtained 493.1 g of a distillation residue. The temperature of the final distillate was 118° C. (0.5 mm Hg). By removing 14.9 g of insoluble material through the filtration of the distillation residue, a final product was obtained. The characteristics of the final product, a basic alkaline earth metal phenate-containing solution, and the product conversion of each starting material are shown in Table 4.

In this example, calcium hydroxide is used as an alkaline earth metal agent; the distillation process jsut after the metal addition reaction is simplified and moreover the product conversion of calcium hydroxide is relatively high.

COMPARATIVE EXAMPLE 4

The same four-necked flask as used in Example 1 was charged with 4.0 mols of nonyl phenol, 1.0 mol of calcium hydroxide having a purity of 95.0% by weight, and 0.6 mol of sulfur, and 0.6 mol of ethylene glycol was added to the suspension as prepared above under atmospheric pressure at 125° C. over 30 minutes (water was not added). The resulting mixture was then stirred while heating at 130° C. for 5 hours to effect the metal addition reaction. This reaction product solution was distilled under reduced pressure to remove water and a very small amount of ethylene glycol, and there was thus obtained 981.2 g of a liquid distillation residue. The temperature of the final distillate was 22° C. (21 mm Hg) and the distillation process was completed in a short period of time.

The distillation residue (961.1 g) was placed in an autoclave and caused to abosrb carbon dioxide under an elevated pressure (not more than 3.65 kg/cm²) at 120° C. over 30 minutes. Subsequently, it was maintained under an elevated pressure (6.0 kg/cm²) at 178° C. for 2 hours to obtain 987.1 g of a reaction product solution. Then 974.7 g of the reaction product solution was diluted with 234.4 g of a 150 neutral oil. The resulting mixture was distilled under reduced pressure to remove unreacted nonyl phenol and ethylene glycol, and there was thus obtained 411.5 g of a distillation residue. The temperature of the final distillate was 145.5° C. (4 mm Hg). The distillation residue was filtered to remove 32.5 g of insoluble material, and 379.0 g of a final product was obtained. The characteristics of the final product, a basic alkaline earth metal phenate-containing solution, and the product conversion of each starting material are shown in Table 4.

In this comparative example, calcium hydroxide was used as an alkaline earth metal agent as in Example 5, but the metal addition reaction was performed without the addition of water to the reaction system from the outside thereof unlike Example 5. Thus, the product conversion of calcium hydroxide is very low compared with that in Example 5, and the residual amount of insoluble material is very large.

TABLE 4

|  | Example 5 | Comparative Example 4 |
|---|---|---|
| Product Conversion of Starting Material (%) |  |  |
| Ca(OH)$_2$ | 87.3 | 61.8 |
| NP | 31.2 | 15.4 |
| S | 71.0 | 52.6 |
| EG | 39.8 | 46.3 |
| CO$_2$ | 52.0 | 45.7 |
| Characteristics of Final Product |  |  |
| Viscosity (cSt at 100° C.) | 79.37 | 62.89 |
| Basic Number (KOH mg/g) | 181 | 178 |
| Ca Content (wt %) | 6.48 | 6.36 |
| S Content (wt %) | 2.86 | 3.10 |
| Content of Reacted CO$_2$ (wt %) | 3.20 | 2.64 |
| Metal Addition Equivalent Ratio | 1.70 | 2.00 |

EXAMPLE 6

A basic alkaline earth metal phenate was prepared in the same manner as in Example 2 except that the amounts of nonyl phenol and water being added were changed from 4.0 mols to 0.8 mol and from 0.9 mol to 1.1 mols, respectively, and 242.3 g of the 150 neutral oil was added to the reaction system not after the treatment with carbon dioxide, but from the start of the metal addition reaction. The amount of n-hexane-insoluble material separated by centrifugal separation was 14.8 g, and the yield of the final product was 428.6 g. The product conversion of each starting material and the characteristics of the final product are shown in Table 5.

EXAMPLE 7

A basic alkaline earth metal phenate was prepared in the same manner as in Example 2 except that the amount of sulfur was changed from 0.6 mol to 3.0 mols, and the temperature and time of the metal addition reaction step were changed from 130° C. to 123° C. and from 5 hours to 4 hours, respectively. The amount of insoluble material was 1.2 g, and the yield of the final product was 780.4 g. The product conversion of each starting material and the characteristics of the final product are shown in Table 5.

EXAMPLE 8

A basic alkaline earth metal phenate was prepared in the same manner as in Example 2 except that sulfur was not used, and the amounts of ethylene glycol, water and the 150 neutral oil used were changed, respectively, from 0.8 mol to 0.6 mol, from 0.9 mol to 1.1 mols, and from 242.3 g to 237.4 g. The amount of insoluble material was 2.6 g, and the yield of the final product was 463.4 g. The product conversion of each starting material and the characteristics of the final product are shown in Table 5.

EXAMPLE 9

A mixture of 2,383.5 g of recovered nonyl phenol (a mixture of 9.0 mols of nonyl phenol, 0.69 mol of ethylene glycol, and 357.9 g of mineral oil) as described hereinafter, 3.0 mols of fresh nonyl phenol, 3.0 mols of calcium oxide having a purity of 95.7% by weight, and 2.1 mols of sulfur was placed in a four-necked reactor equipped with a stirrer, a condenser tube, a nitrogen gas inlet tube, and a thermometer and stirred to prepare a suspension. To this suspension, a mixture of 0.96 mol of ethylene glycol and 3.0 mols of water was added under an elevated pressure of 2 kg/cm² at 145° C. over 30 minutes, and the resulting mixture was then stirred while heating at 160° C. and 2 kg/cm² for 4 hours to effect the metal addition reaction. The thus-obtained reaction product solution was distilled under reduced pressure to remove water and a very small amount of ethylene glycol, and there was thus obtained 3,268.6 g of a liquid distillation residue. The temperature of the final distillate was 41.5° C. (7.5 mm Hg), and the distillation process was completed in a short period of time.

The distillation residue was placed in an autoclave and caused to absorb carbon dioxide under an elevated pressure (not more than 2.4 kg/cm²) at 120° C. over 30 minutes. Subsequently, it was maintained under an elevated pressure (6 kg/cm²) at 178° C. for 2 hours to obtain 3,350.6 g of a reaction product solution. Then, 3,202.5 g of the reaction product solution was diluted with 695.5 g of a 150 neutral oil. The resulting mixture was distilled under reduced pressure to remove unreacted nonyl phenol and ethylene glycol, and there was thus obtained 1,555.0 g of a distillation residue. The temperature of the final distillate was 157° C. (1 mm Hg). The distillate containing nonyl phenol and ethylene glycol, as recovered by the foregoing distillation process was recycled as the recovered nonyl phenol to the above-described metal addition reaction step. The distillation residue as obtained above was filtered to remove 5.5 g of insoluble material, and 1,549.5 g of a final product was obtained. The characteristics of the final product, a basic alkaline earth metal phenate-containing solution, and the product conversion of each starting material are shown in Table 5.

TABLE 5

|  | Example | | | |
| --- | --- | --- | --- | --- |
|  | 6 | 7 | 8 | 9 |
| Product Conversion of Starting Material (%) | | | | |
| CaO | 90.5 | 99.1 | 97.6 | 98.4 |
| NP | 44.9 | 47.9 | 16.4 | 21.8 |
| S | 48.5 | 50.9 | — | 68.5 |
| EG | 74.5 | 43.3 | 61.5 | 60.3 |
| $CO_2$ | 74.0 | 50.8 | 49.7 | 70.7 |
| Characteristics of Final Product | | | | |
| Viscosity (cSt at 100° C.) | 78.90 | 1007 | 88.34 | 144.6 |
| Basic Number (KOH mg/g) | 232 | 142 | 231 | 206 |
| Ca Content (wt %) | 8.26 | 5.07 | 8.22 | 7.34 |
| S Content (wt %) | 2.18 | 6.27 | — | 2.88 |
| Content of Reacted $CO_2$ (wt %) | 6.08 | 1.23 | 4.22 | 3.73 |
| Metal Addition Equivalent Ratio | 5.04 | 1.04 | 2.97 | 2.26 |

Example 6 is an example in which the amount of the alkaline earth metal used per the phenol is large, Example 7 is an example in which the amount of sulfur used per the alkaline earth metal agent is large, Example 8 is an example in which sulfur is not used, and Example 9 is an example in which the metal addition reaction is performed at an elevated temperature. In each case, the time taken for the distillation step just after the metal addition reaction is short and, therefore, the total production time is shortened and the necessary utilities are reduced. Moreover, as can be seen from Table 5, the product conversion of the alkaline earth metal agent is very high and the residual amount of insoluble material is reduced.

While the invention has been described in detail and with reference to specific embodiments thereof, it will be apparent to one skilled in the art that various changes and modifications can be made therein without departing from the spirit and scope thereof.

What is claimed is:

1. A process for producing a basic alkaline earth metal phenate, comprising the steps of:

providing reactants comprised of a mixture of a phenol, a dihydric alcohol, and an alkaline earth metal agent selected from the group consisting of alkaline earth metal oxides and hydroxides, said dihydric alcohol being in an amount of at least 0.15 mol per mol of the alkaline earth metal agent, and said alkaline earth metal agent being in an amount of from 0.001 to 20 equivalents per equivalent of the phenol;

allowing the reactants to react and achieve addition of the metal to the phenol at a temperature of from 60° C. to 200° C.;

adding water to the reactants while they are allowed to react, the water being added in an amount of from 0.01 to 10 mols per mol of the alkaline earth metal agent; and thereafter treating the metal addition reaction product with carbon dioxide at a temperature of from 50° C. to 230° C.

2. A process for producing a basic alkaline earth metal phenate as claimed in claim 1, wherein the reactants are comprised substantially of a phenol, a dihydric alcohol and an alkaline earth metal agent.

3. A process for producing a basic alkaline earth metal phenate as claimed in claim 1, wherein the reactants are comprised substantially of a phenol, a dihydric alcohol, an alkaline earth metal agent, and sulfur.

4. A process for producing a basic alkaline earth metal phenate as claimed in claim 1, wherein the water is added in an amount in the range of 0.1 to 2.0 mols per mol of the alkaline earth metal agent.

5. A process for producing a basic alkaline earth metal phenate as claimed in claim 1, wherein the addition of the metal to the phenol is performed in the presence of a diluent.

6. A process for producing a basic alkaline earth metal phenate as claimed in claim 1, wherein the addition of the metal to the phenol is carried out at a temperature in the range of 90° to 190° C.

7. A process for producing a basic alkaline earth metal phenate as claimed in claim 1, comprising removing insoluble materials from the product resulting from the carbon dioxide treatment.

8. A process for producing a basic alkaline earth metal phenate as claimed in claim 1, wherein the carbon dioxide treatment is performed at a temperature in the range of from 100° C. to 230° C.

9. A process for producing a basic alkaline earth metal phenate as claimed in claim 1 wherein the carbon dioxide treatment is performed at a temperature in the range of from 80° C. to 200° C.

10. A process for producing a basic alkaline earth metal phenate as claimed in claim 1, wherein the phenol is a phenol having a hydrocarbon side chain containing from 4 to 36 carbon atoms.

11. A process for producing a basic alkaline earth metal phenate as claimed in claim 1, wherein the alkaline earth metal agent is selected from the group consisting of oxides and hydroxides of an element selected from the group consisting of calcium, barium, strontium, and magnesium.

12. A process for producing a basic alkaline earth metal phenate as claimed in claim 1, wherein the alkaline earth metal agent is present in an amount in the range of from 0.001 to 20 equivalents per equivalent of the phenol.

13. A process for producing a basic alkaline earth metal phenate as claimed in claim 1, wherein the dihydric alcohol contains 2 to 6 carbon atoms.

14. A process for producing a basic alkaline earth metal phenate as claimed in claim 1, wherein the dihydric alcohol is present in an amount in the range of from 0.15 1 to 3.0 mols per mol of alkaline earth metal agent.

15. A process for producing a basic alkaline earth metal phenate as claimed in claim 3, wherein the sulfur is present in an amount of 4.0 mols or less per mol of the alkaline earth metal agent.

16. A process for producing a basic alkaline earth metal phenate as claimed in claim 5, wherein the diluent is selected from the group consisting of lubricating oil fractions and higher alcohols containing from 8 to 24 carbon atoms.

17. A process for producing a basic alkaline earth metal phenate as claimed in claim 1, wherein the phenol is a phenol which is liquid at a temperature of 130° C.

18. A process for producing a basic alkaline earth metal phenate as claimed in claim 17, wherein the phenol is a phenol which is a liquid at a temperature of 120° C.

19. A process for producing a basic alkaline earth metal phenate as claimed in claim 1, wherein the alkaline earth metal agent is present in an amount in the range of 0.01 to 6 equivalents per equivalent of the phenol.

20. A process for producing a basic alkaline earth metal phenate as claimed in claim 14, wherein the dihydric alcohol is selected from the group consisting of ethylene glycol and propylene glycol and is present in an amount in the range of 0.3 to 1.5 mols per mol of the alkaline earth metal agent.

21. A process for producing a basic alkaline earth metal phenate as claimed in claim 1, wherein the addition of the metal to the phenol is carried out at a temperature in the range of 90° C. to 190° C. over a period of time of about 1 hour to 9 hours and subsequently 30% or more of the water added is distilled off.

22. A process for producing a basic alkaline earth metal phenate as claimed in claim 21, wherein 60% or more of the water is distilled off after the reaction.

* * * * *